US006580984B2

(12) United States Patent
Fecher et al.

(10) Patent No.: US 6,580,984 B2
(45) Date of Patent: Jun. 17, 2003

(54) METHOD AND DEVICE FOR SUPPLYING INFORMATION TO A DRIVER OF A VEHICLE

(75) Inventors: Dana B. Fecher, Farmington Hills, MI (US); Jeffrey M. Stefan, Clawson, MI (US); Gregory H. Williams, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/949,338

(22) Filed: Sep. 7, 2001

(65) Prior Publication Data

US 2003/0050740 A1 Mar. 13, 2003

(51) Int. Cl.$^7$ .............................. G06F 19/00
(52) U.S. Cl. .......................... 701/36; 340/438
(58) Field of Search .................. 701/1, 29, 36; 340/425.5, 438, 439, 441

(56) References Cited

U.S. PATENT DOCUMENTS

| 5,191,312 A | * | 3/1993 | Altmann et al. ............ 340/441 |
| 5,309,139 A | | 5/1994 | Austin |
| 5,450,321 A | | 9/1995 | Crane |
| 5,648,755 A | * | 7/1997 | Yagihashi .................... 340/439 |
| 5,781,872 A | | 7/1998 | Konishi et al. |
| 5,949,345 A | * | 9/1999 | Beckert et al. ......... 340/815.41 |
| 6,009,355 A | | 12/1999 | Obradovich et al. |
| 6,181,996 B1 | * | 1/2001 | Chou et al. ................... 701/36 |
| 6,188,315 B1 | * | 2/2001 | Herbert et al. ............... 340/438 |
| 6,266,589 B1 | * | 7/2001 | Boies et al. ................... 701/36 |
| 6,349,257 B1 | * | 2/2002 | Liu et al. ..................... 701/200 |
| 2002/0120374 A1 | * | 8/2002 | Douros et al. ................. 701/29 |

FOREIGN PATENT DOCUMENTS

| GB | 2 352 521 | 3/2000 |
| GB | 2 360 500 | 3/2001 |

* cited by examiner

Primary Examiner—Michael J. Zanelli
(74) Attorney, Agent, or Firm—Brinks Hofer Gilson & Lione

(57) ABSTRACT

A method for supplying information to a driver of a vehicle is provided. The preferred method includes estimating a cognitive load on the driver, sensing information for the driver, selecting information based on the estimated cognitive load, and supplying the selected information to the driver.

41 Claims, 3 Drawing Sheets

METHOD AND DEVICE FOR SUPPLYING INFORMATION TO A DRIVER OF A VEHICLE

TECHNICAL FIELD OF THE INVENTION

This invention relates generally to the automotive interiors field, and more specifically to a method and device for supplying information to a driver of a vehicle.

BACKGROUND OF THE INVENTION

In certain situations during the operation of a vehicle, the cognitive load on a driver is relatively low. During the situations, the driver could reasonably receive a relatively high amount of information, such as vehicle performance information. In other situations, the cognitive load on the driver is relatively high and the driver should, for safety reasons, receive a relatively low amount of information. Traditional vehicles, however, do not recognize these different situations. Thus, there is a need in the automotive interiors field to provide a new and useful method and device for supplying information to the driver of a vehicle.

DETAILED DESCRIPTION OF THE PREFERRED METHOD

The present invention has been specifically created for supplying information to a driver of a vehicle. For this reason, the preferred method and embodiment of the invention will focus on this function. Alternative methods and embodiments of this invention, however, may function in a different way or in a different environment.

Figure 1:
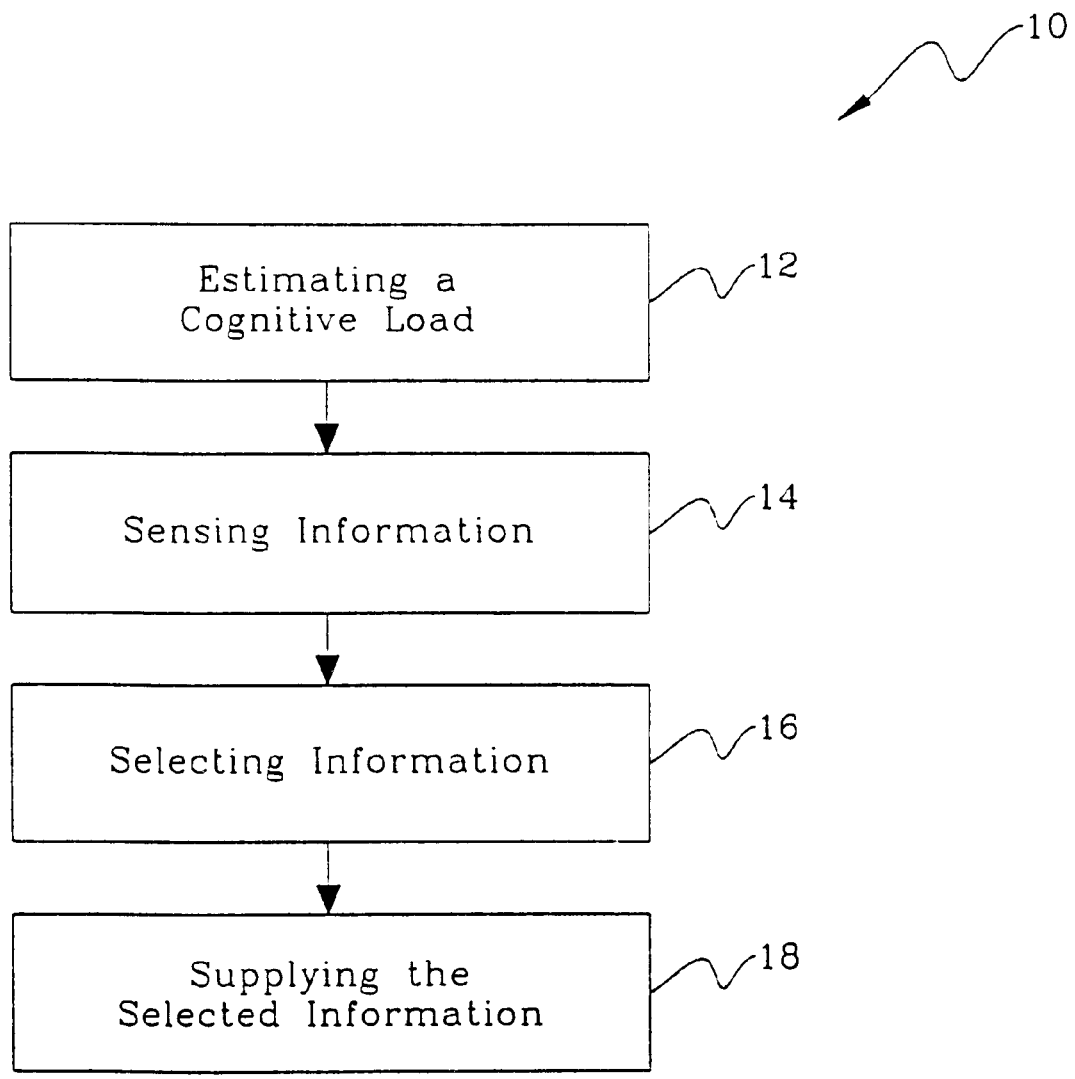
FIG. 1 is a flowchart of the preferred method of the invention.

As shown in FIG. 1, the preferred method 10 of the invention for supplying information to a driver of a vehicle in an environment includes estimating a cognitive load 12 on the driver, sensing information 14 for the driver, selecting information 16 based on the estimated cognitive load, and supplying the selected information 18 to the driver. Although these acts of the preferred method are preferably preformed in chronological order, these acts may be preformed in any suitable order. Furthermore, although these acts of the preferred method are preferably performed in a continuous cycle during the operation of the vehicle, these acts may alternatively be preformed for a limited duration, under certain circumstances, or for a limited number of cycles.

Figure 2:
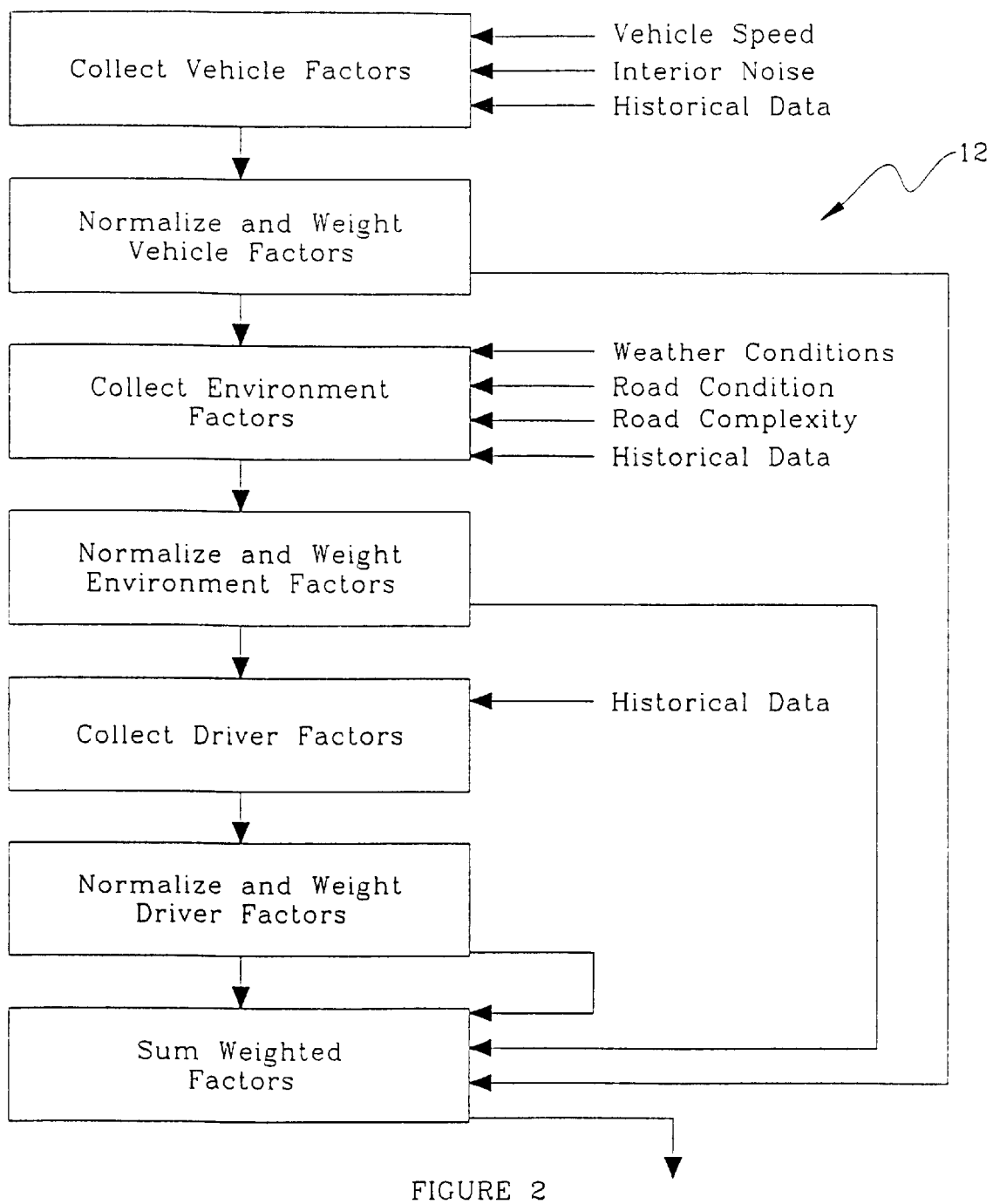
FIG. 2 is a flowchart of the estimating act of the preferred method.

The act of estimating a cognitive load 12 on the driver functions to approximate the amount of information that the drive could, or should, receive during the operation of the vehicle. The act of estimating the cognitive load 12 on the driver is preferably estimated by collecting several factors, such as vehicle factors, environmental factors, and driver factors, as shown in FIG. 2.

The vehicle factors collected to estimate the cognitive load on the driver preferably include the vehicle speed of the vehicle and the interior noise of the vehicle. The vehicle speed of the vehicle is preferably collected by a traditional speedometer, but may alternatively be collected by any suitable means. Likewise, the interior noise of the vehicle is preferably collected by a traditional microphone, but may alternatively be collected by any suitable means. The vehicle factors may alternatively include the acceleration of the vehicle, the throttle input by the driver, the deceleration of the vehicle, the brake input by the driver, the yawl rate of the vehicle, the steering input by the driver, the number of passengers in the vehicle, the presence of a baby in the vehicle, and the usage of a mobile phone or navigational system in the vehicle. These alternative vehicle factors are preferably collected by traditional sensors, but may alternatively be collected by any suitable means.

The environmental factors collected to estimate the cognitive load on the driver preferably include the weather condition of the environment, the road condition of the environment, and the road complexity of the environment. The weather condition of the environment is preferably collected by a windshield-wiper usage sensor, which estimates the precipitation in the environment. The weather condition may alternatively be collected by a GPS system that gathers information from a weather source, an infrared system that detects the visibility and precipitation in the environment, or by any other suitable means. The road condition of the environment is preferably collected by a traction-control usage sensor or an anti-lock brake usage sensor, but may alternatively be collected by other suitable means, such as an infrared system that detects the presence of water, snow, or ice on the surface of the road near the vehicle. The road complexity of the environment is preferably collected by a GPS system and a road complexity database. The road complexity database, which is preferably stored in or downloaded into the vehicle, preferably includes information on the traffic density and construction interferences near the vehicle. The road complexity of the environment, however, may alternatively be collected by other suitable means, such as an infrared system that detects the presence of other vehicles.

In the preferred method, the vehicle factors, the environmental factors, and the driver factors also include historical data, which is preferably collected or downloaded and stored in the vehicle. The historical data of the vehicle, the environment, and the driver preferably include the number, the severity, and the frequency of the accidents experienced by the vehicle, in the environment, and by the driver, respectively. The historical data of these factors may alternatively include other suitable information. The historical data of the vehicle may be collected by an accident sensor, such as an airbag-deployment sensor in a vehicle, but may alternatively be collected by other suitable means. The historical data of the environment is preferably collected by a GPS system, but may alternatively be collected by other suitable means. The historical data of the driver is preferably collected by an accident sensor, such as an airbag-deployment sensor, and is preferably identified by an individual key for an individual driver. The historical data of an individual driver may be alternatively be collected by other suitable means, such as a traditional seat position sensor with a memory.

The act of estimating the cognitive load 12 on the driver also preferably includes normalizing the collected factors, weighting the normalized factors, and summing the weighted factors. The act of estimating the cognitive load 12 on the driver may alternatively include other suitable methods to combine the collected values. The acts of normalizing, weighting, and summing are preferably accomplished by traditional circuits or software, but may alternatively be accomplished by any suitable means.

The act of sensing information for the driver preferably includes sensing vehicle performance information, vehicle position information, engine performance, climate control information, audio control information, driver usage information, and vehicle warning information. The act of sensing information may, however, alternatively include sensing other suitable information for the driver.

The vehicle performance information preferably includes the total miles driven and the fuel consumption of the vehicle, but may alternatively include other suitable information. The vehicle position information preferably includes the GPS position and any destination directions, but may alternatively include other suitable information. The engine performance information preferably includes the oil pressure, the oil temperature, the engine temperature, the engine speed, the engine torque, and the engine horsepower, but may alternatively include other suitable information. The climate control information preferably includes the interior temperature of the vehicle and the fan speed of the HVAC system, but may alternatively include other suitable information. The audio control information preferably includes the volume, the base, the treble, the fade, and the balance of the audio system, but may alternatively include other suitable information. The driver usage information preferably includes the high beam, the turn signal, the hazard, and the cruise control usage by the driver, but may alternatively include other suitable usages by the driver. Finally, the vehicle warning information preferably includes a low fuel, a high engine speed, a low oil, a low battery voltage, a high engine temperature, a low tire pressure, a low wiper fluid, a scheduled maintenance, a door ajar, a seat belt disconnection, an anti-lock brake, a traction control, a supplement restraint, and an engine warning or malfunction. The vehicle warning information may alternatively include other suitable information. All of this information is preferably sensed by traditional sensors, such as traditional odometers, traditional temperature gauges, traditional pressure gauges, and traditional usage and warning sensors. This information may alternatively be sensed by other suitable means.

The act of selecting information based on the estimated cognitive load preferably includes selecting information from the sensed information. For this reason, the act of selecting information is preferably accomplished after the act of sensing information. The act of selecting information, however, may alternatively be accomplished before the act of sensing information. In this alternative method, only the selected information is actually sensed.

Figure 3:
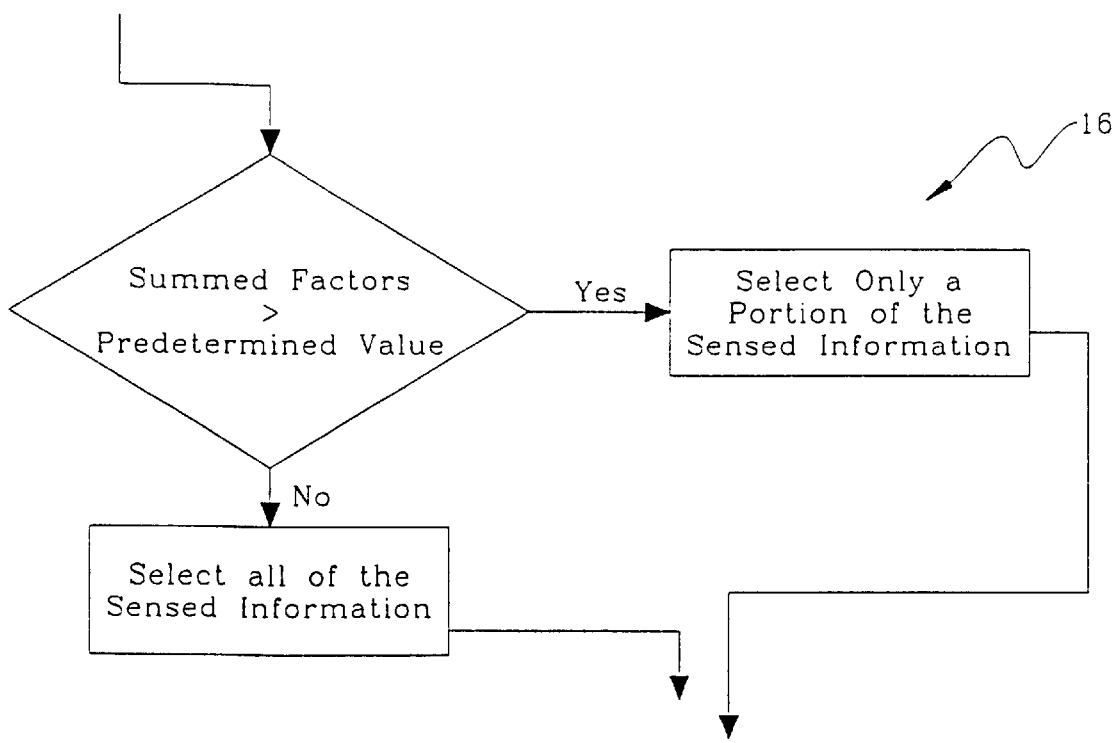
FIG. 3 is a flowchart of the selecting act of the preferred method.

As shown in FIG. 3, the act of selecting information 16 preferably includes comparing the summed factor to a predetermined value. The act also preferably includes selecting all the sensed information if the summed factor is less than the predetermined value, and selecting only a portion of the sensed information if the summed factor is greater than the predetermined value. The act of selecting information preferably includes a circuit or software for the comparison and a priority lookup table for the selecting, but may alternatively include other suitable means for these purposes.

The act of supplying the selected information preferably includes visually supplying the selected information to the driver, aurally supplying the selected information to the driver, or both visually and aurally supplying the selected information to the driver. Visually supplying the selected information is preferably accomplished by a traditional display screen or a traditional HUD device, but may alternatively be supplied by other suitable means. Aurally supplying the selected information is preferably accomplished by traditional speakers, such as the audio speakers of a vehicle, but may alternatively be supplied by other suitable means.

As any person skilled in the art of automotive interiors will recognize from the previous description and from the figures and claims, modifications and changes can be made to the preferred method and embodiment of the invention without departing from the scope of the invention defined in the following claims.

We claim:

1. A method for supplying information to a driver of a vehicle in an environment, comprising:
   collecting a vehicle factor, wherein said collecting a vehicle factor includes collecting the interior noise of the vehicle;
   estimating a cognitive load on the driver based on the collected vehicle factor;
   sensing information for the driver;
   selecting information based on the estimated cognitive load; and
   supplying the selected information to the driver.

2. The method according to claim 1 wherein said collecting a vehicle factor further includes collecting the vehicle speed of the vehicle.

3. The method according to claim 2 wherein said collecting a vehicle factor further includes collecting historical data of the vehicle.

4. The method according to claim 1 further comprising collecting an environmental factor, wherein said estimating a cognitive load further includes estimating a cognitive load on the driver based on the collected environmental factor.

5. The method according to claim 4 wherein said collecting an environmental factor includes collecting an environmental factor selected from the group consisting of weather condition of the environment, road condition of the environment, and road complexity of the environment.

6. The method according to claim 5 wherein said collecting an environmental factor further includes collecting historical data of the environment.

7. The method according to claim 1 wherein said estimating a cognitive load includes collecting a driver factor.

8. The method according to claim 7 wherein said collecting a driver factor includes collecting historical data of the driver.

9. The method according to claim 1 wherein said selecting information includes selecting information from the sensed information.

10. The method according to claim 1 wherein said sensing information includes sensing information selected from the group consisting of vehicle performance information, vehicle position information, engine performance information, climate control information, audio control information, driver usage information, and vehicle warning information.

11. The method according to claim 1 wherein said estimating a cognitive load includes collecting several factors, normalizing the collected factors, weighting the normalized factors, and summing the weighted factors.

12. The method according to claim 11 wherein said selecting information further includes comparing the summed factor to a predetermined value and selecting only a portion of the sensed information if the summed factor is greater than the predetermined value.

13. The method according to claim 1 wherein said supplying the selected information includes visually and aurally supplying the selected information to the driver.

14. A method for supplying information to a driver of a vehicle in an environment, comprising:
   collecting an environmental factor, wherein said collecting an environmental factor includes collecting the weather condition of the environment;
   estimating a cognitive load on the driver based on the collected environmental factor;
   sensing information for the driver;
   selecting information based on the estimated cognitive load; and
   supplying the selected information to the driver.

15. The method according to claim 14 further comprising collecting a vehicle factor, wherein said estimating a cognitive load further includes estimating a cognitive load based on the collected vehicle factor.

16. The method according to claim 15 wherein said collecting a vehicle factor includes collecting vehicle speed of the vehicle.

17. The method according to claim 16 wherein said collecting a vehicle factor includes collecting interior noise of the vehicle.

18. The method according to claim 17 wherein said collecting a vehicle factor further includes collecting historical data of the vehicle.

19. The method according to claim 14 wherein said collecting an environmental factor further includes collecting the road condition of the environment.

20. The method according to claim 19 wherein said collecting an environmental factor further includes collecting the road complexity of the environment.

21. The method according to claim 20 wherein said collecting an environmental factor further includes collecting historical data of the environment.

22. The method according to claim 14 wherein said estimating a cognitive load includes collecting a driver factor.

23. The method according to claim 22 wherein said collecting a driver factor includes collecting historical data of the driver.

24. The method according to claim 14 wherein said selecting information includes selecting information from the sensed information.

25. The method according to claim 24 wherein said sensing information includes sensing information selected from the group consisting of vehicle performance information, vehicle position information, engine performance information, climate control information, audio control information, driver usage information, and vehicle warning information.

26. The method according to claim 14 wherein said estimating a cognitive load includes collecting several factors, normalizing the collected factors, weighting the normalized factors, and summing the weighted factors.

27. The method according to claim 26 wherein said selecting information further includes comparing the summed factor to a predetermined value and selecting only a portion of the sensed information if the summed factor is greater than the predetermined value.

28. The method according to claim 14 wherein said supplying the selected information includes visually and aurally supplying the selected information to the driver.

29. A method for supplying information to a driver of a vehicle in an environment, comprising:
   collecting several factors, normalizing the collected factors, weighting the normalized factors, and summing the weighted factors;
   estimating a cognitive load on the driver based on the summed and weighted factors;
   sensing information for the driver;
   selecting information based on the estimated cognitive load; and
   supplying the selected information to the driver.

30. The method according to claim 29 wherein said selecting information further includes comparing the summed factor to a predetermined value and selecting only a portion of the sensed information if the summed factor is greater than the predetermined value.

31. The method according to claim 29 wherein said collecting several factors includes collecting a vehicle factor.

32. The method according to claim 31 wherein said collecting a vehicle factor includes collecting a vehicle factor selected from the group consisting of vehicle speed of the vehicle and interior noise of the vehicle.

33. The method according to claim 32 wherein said collecting a vehicle factor further includes collecting historical data of the vehicle.

34. The method according to claim 29 wherein said collecting several factors includes collecting an environmental factor.

35. The method according to claim 34 wherein said collecting an environmental factor includes collecting an environmental factor selected from the group consisting of weather condition of the environment, road condition of the environment, and road complexity of the environment.

36. The method according to claim 35 wherein said collecting an environmental factor further includes collecting historical data of the environment.

37. The method according to claim 29 wherein said collecting several factors includes collecting a driver factor.

38. The method according to claim 37 wherein said collecting a driver factor includes collecting historical data of the driver.

39. The method according to claim 29 wherein said selecting information includes selecting information from the information.

40. The method according to claim 29 wherein said sensing information includes sensing information selected from the group consisting of vehicle performance information, vehicle position information, engine performance information, climate control information, audio control information, driver usage information, and vehicle warning information.

41. The method according to claim 29 wherein said supplying the selected information includes visually and aurally supplying the selected information to the driver.

* * * * *

UNITED STATES PATENT AND TRADEMARK OFFICE
CERTIFICATE OF CORRECTION

PATENT NO.     : 6,580,984 B2
DATED          : June 17, 2003
INVENTOR(S)    : Dana B. Fecher et al.

It is certified that error appears in the above-identified patent and that said Letters Patent is hereby corrected as shown below:

<u>Column 6,</u>
Line 47, before "information." insert -- sensed --.

Signed and Sealed this

Second Day of December, 2003

JAMES E. ROGAN
*Director of the United States Patent and Trademark Office*